UNITED STATES PATENT OFFICE.

TIMOTHY COTTER AND THOMAS H. WALKER, OF KANSAS CITY, MISSOURI, ASSIGNORS OF ONE-THIRD TO JOHN McDONNELL, OF SAME PLACE.

COMPOSITION OF MATTER.

SPECIFICATION forming part of Letters Patent No. 569,859, dated October 20, 1896.

Application filed March 4, 1896. Serial No. 581,843. (No specimens.)

*To all whom it may concern:*

Be it known that we, TIMOTHY COTTER and THOMAS H. WALKER, of Kansas City, in the county of Jackson and State of Missouri, have invented a new and useful Composition of Matter to be Used for Paving, of which the following is a specification.

Our composition consists of the following ingredients combined in the proportions stated: coal-tar pitch, five to eight per cent.; coal-tar, four to seven per cent.; hydrate of lime, eleven to fifteen per cent.; oil, one-fourth to one per cent.; sand or its equivalent, seventy to eighty per cent.

In order to produce the paving material, we proceed as follows: First, we take from five to eight per cent. of coal-tar pitch having a melting-point from about 185° to 200° Fahrenheit and place it in a steam-jacketed mixing apparatus to melt the pitch, and when it is melted we add from four to seven per cent. of coal-tar, preferably such as is found in the hydraulic main of gas-works. The materials are thus combined and thoroughly mixed by stirring, and then we add from eleven to fifteen per cent. of air-slaked lime in a finely-powdered state and start the mixing apparatus, so as to thoroughly incorporate the above material with the mixture to form a smooth paste. We then add from one-fourth to one per cent. of oil and again mix the mass, and then the material is ready to receive the sand, which is prepared by thoroughly drying and screening. The sand is run into the mixture in a hot state, or at a temperature of about 212° Fahrenheit. The mixing apparatus is then again started to thoroughly incorporate all the above ingredients, the mixture forming a paving material. The composition of matter thus produced is then molded into any desired form and laid directly down in blocks or flags, or spread and tamped, or rolled directly on the streets, sidewalks, driveways, &c. The paving material thus produced is capable of withstanding the heat of summer and the cold of winter and of resisting abrasion and wear. When subjected to the heat of summer, it is sufficiently strong to resist cutting or wear from traffic passing over the pavement, and when frozen it retains sufficient elasticity to give or bend slightly under pressure, without fracture.

By combining the hard pitch with the coal-tar we obtain a mixture in which carbolic and cresylic acids are greatly reduced, thereby forming a combination that cannot be made by concentrating coal-tar to the same specific gravity. It is evident that all of the carbolic and cresylic acids are expelled from the pitch above mentioned, thereby reducing the percentage of the acids to less than one-half of what they would contain if concentrated to the same specific gravity of the mixed materials. Furthermore, by mixing pitch and tar we retain in the latter all the volatile oils that would otherwise be expelled by a concentrating process, and hence increase the percentage of light oils and decrease the percentage of acids, which latter, if contained in a large quantity in the material, is objectionable, for the reason that their reaction on the lime prevents it from forming a paste of proper consistency. By our method we retain just sufficient acid for reducing the proper amount of lime to rosolic acid. By retaining a percentage of light oils and the addition of the above-named percentage of oil we gain another point, namely, the ability of resisting fracture when the material is frozen and also to resist water, as the material is non-porous and perfectly waterproof.

The sand or its equivalent is proportionate to its size and chemical composition. For instance, if it is pure quartz sand or what is called "sharp" sand, then the size must determine the quantity; but we have found by repeated experiments that if the sand is what is known as "coarse" sand, that will pass through a screen of No. 6 wire mesh per inch, there should be mixed about an equal portion of fine sand that will pass through a screen of No. 30 wire mesh. We have also found that the material is better when a certain percentage of calcareous sand is added, as pure silicious sand does not produce as good a material.

What we claim, and desire to secure by Letters Patent, is—

The composition of matter, consisting of coal-tar pitch, coal-tar, hydrate of lime, oil, and sand or its equivalent, in about the proportions specified, as and for the purpose set forth.

TIMOTHY COTTER.
THOMAS H. WALKER.

Witnesses:
   JOSEPH GLENN,
   WALTER A. RAILSBACK.